No. 729,537. PATENTED JUNE 2, 1903.
H. H. BUFFUM.
PISTON BEARING OILER.
APPLICATION FILED NOV. 7, 1902.
NO MODEL.
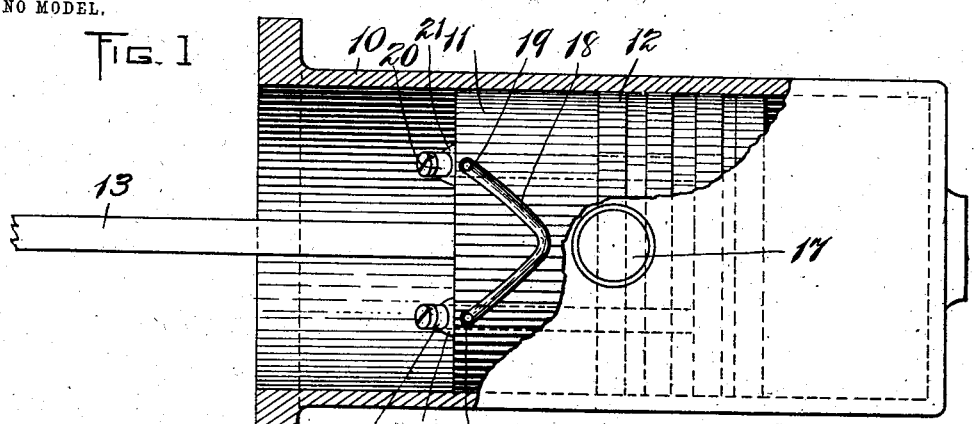
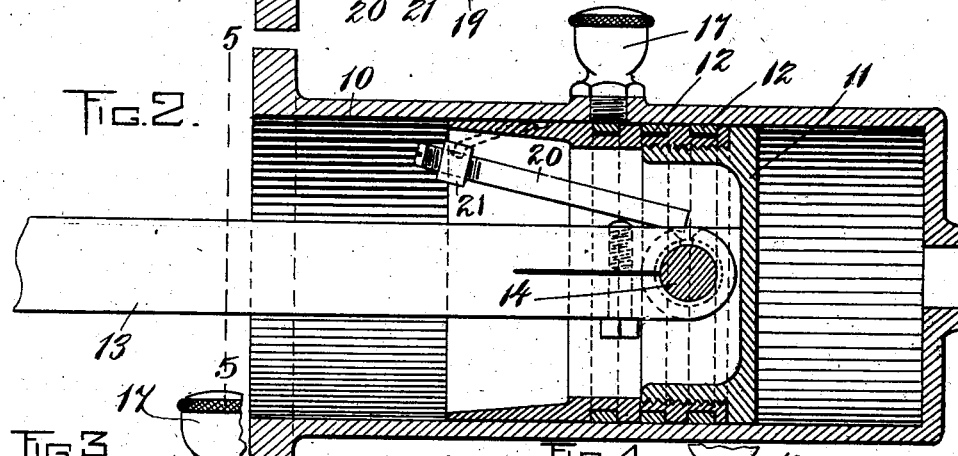
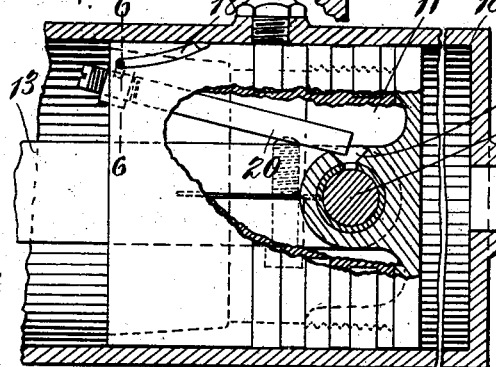
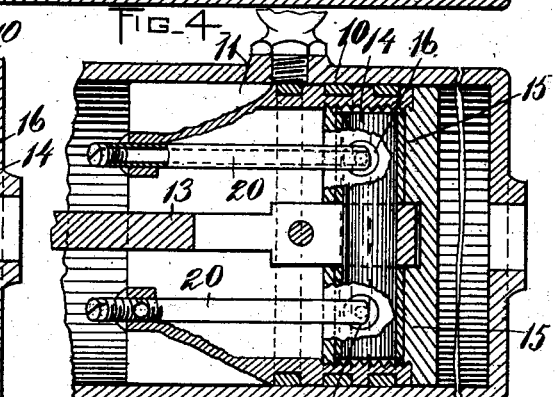
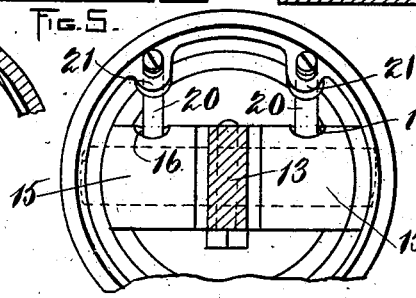
WITNESSES:
INVENTOR:
H. H. Buffum
by Wright, Brown & Quinby
Attys.
THE NORRIS PETERS CO., PHOTO-LITHO., WASHINGTON, D. C.

No. 729,537. Patented June 2, 1903.

UNITED STATES PATENT OFFICE.

HERBERT H. BUFFUM, OF ABINGTON, MASSACHUSETTS.

PISTON-BEARING OILER.

SPECIFICATION forming part of Letters Patent No. 729,537, dated June 2, 1903.

Application filed November 7, 1902. Serial No. 130,420. (No model.)

*To all whom it may concern:*

Be it known that I, HERBERT H. BUFFUM, of Abington, in the county of Plymouth and State of Massachusetts, have invented certain new and useful Improvements in Piston-Bearing Oilers, of which the following is a specification.

This invention relates to oiling devices for the wrist connection between the pitman and piston in engines employing trunk-pistons. Owing to the secluded locality of this bearing it has heretofore been a matter of difficulty to effectively oil the same, and reliance is usually placed on the oil which will splash or creep into the bearing for oiling it.

My invention provides simple and effective means for overcoming the difficulties heretofore encountered in oiling piston-bearings.

Of the accompanying drawings, Figure 1 represents a plan view, partly in horizontal section, showing a horizontal cylinder and piston provided with my improved oiler. Fig. 2 represents a vertical section of the same. Fig. 3 shows a sectional view of the cylinder with the piston broken away and in section at one side of its central plane. Fig. 4 represents a view, mainly in section, on the horizontal plane of the piston and cylinder. Fig. 5 represents a section on line 5 5 of Fig. 2 on a reduced scale. Fig. 6 represents a detail section on line 6 6 of Fig. 3.

The same reference characters indicate the same parts in all the figures.

In the drawings, 10 is the cylinder of a single-acting engine, such as an explosion-engine, 11 is a trunk-piston within the same, of the usual cup shape, provided with packing-rings 12 12, and 13 is a pitman or connecting-rod, to which is clamped a pin 14, the ends of which form journals, mounted in bearings 15 15 on the piston. The upper wall of each of these bearings is bored through with a vertical funnel-shaped duct 16 to receive the oil.

17 is an oil-cup screwed in the upper wall of the cylinder 10 for distributing oil upon the periphery of the piston 11 to lubricate its passage back and forth in the cylinder. A V-shaped open channel or surface duct 18 is formed on the upper side of the lip of piston 11 with the apex of the V extended toward the cylinder-head and its two limbs terminating near the outward edge or margin of the piston. At the ends of this duct short holes 19 19 are bored in the shell of the piston and connect said duct with the interiors of two inclined tubes 20 20, screwed in lugs 21 21, cast on the lip of the piston and having their lower ends residing in the mouths of the ducts 16. The surface duct 18 need not reach or pass underneath the outlet of oil-cup 17, but may be some distance forward of said oil-cup at its nearest approach thereto, as indicated in the drawings. By reason, however, of capillarity, inertia, and other forces acting on the oil the latter will be distributed throughout the length of the piston 11 and over the inner surface of the cylinder, and a portion thereof will fill the duct 18 and flow through the tubes 20 20 and into the ducts 16 16, so as to effectively lubricate the bearings of the pin 14.

I do not confine myself to the exact details of construction herein described, as various modifications may be made within the scope of the invention.

I claim—

1. In a piston-bearing oiler, the combination of a cylinder, a trunk-piston therein having a packed zone, a pitman, a journal and bearing connecting said piston and pitman and located opposite said packed zone, means to supply lubricant to the periphery of said piston, and a lubricating-channel leading from a point on the piston periphery forward of said packed zone longitudinally of the piston to said journal and bearing.

2. In a piston-bearing oiler, the combination of a cylinder, a trunk-piston therein, a pitman, a journal and bearing connecting said piston and pitman, an oil-channel leading from the periphery of said piston to said journal and bearing and including a tube 20 disposed longitudinally of the piston within the latter's shell and supported from the forward or outward lip of said piston, and means for supplying lubricant to the periphery of said piston.

In testimony whereof I have affixed my signature in presence of two witnesses.

HERBERT H. BUFFUM.

Witnesses:
WILLIAM J. COUGHLAN,
JENNIE L. BUFFUM.